United States Patent

Schmidt et al.

[11] 4,042,502
[45] Aug. 16, 1977

[54] DETOXIFICATION OF CYANIDES AND CYANIDE-CONTAINING SOLUTIONS

[75] Inventors: Joachim Schmidt; Wolfgang Bamberg; Hartmut Grunert; Erhard Schorm; Christian Weigelt, all of Jena, Germany

[73] Assignee: VEB Jenapharm Jena

[21] Appl. No.: 560,989

[22] Filed: Mar. 21, 1975

Related U.S. Application Data

[62] Division of Ser. No. 443,013, Feb. 15, 1974, abandoned.

[30] Foreign Application Priority Data

May 10, 1973 Germany .............................. 170844

[51] Int. Cl.² ............................................... C02C 5/02
[52] U.S. Cl. ......................................... 210/59; 210/71; 210/DIG. 31
[58] Field of Search ................... 210/50, 59, 63 R, 71, 210/DIG. 31, 60, 56

[56] References Cited

U.S. PATENT DOCUMENTS

| | | | |
|---|---|---|---|
| 2,459,464 | 1/1949 | Smith | 210/63 R |
| 3,464,917 | 9/1969 | Porteous | 210/71 |
| 3,808,126 | 4/1974 | Prodt | 210/63 R |
| 3,945,919 | 3/1976 | Schindewolf | 210/50 |

*Primary Examiner*—Thomas G. Wyse
*Attorney, Agent, or Firm*—Michael J. Striker

[57] ABSTRACT

The method comprises preheating a cyanide solution to be detoxified by passing the cyanide solution through a heat exchanger and initiating a detoxifying hydrolysis of the cyanide solution by subjecting the cyanide solution to a temperature shock raising the temperature of the cyanide solution to between about 200° and 250° C and passing the cyanide solution through a tubular reactor at a pressure of between about 40 and 140 atm.

11 Claims, 2 Drawing Figures

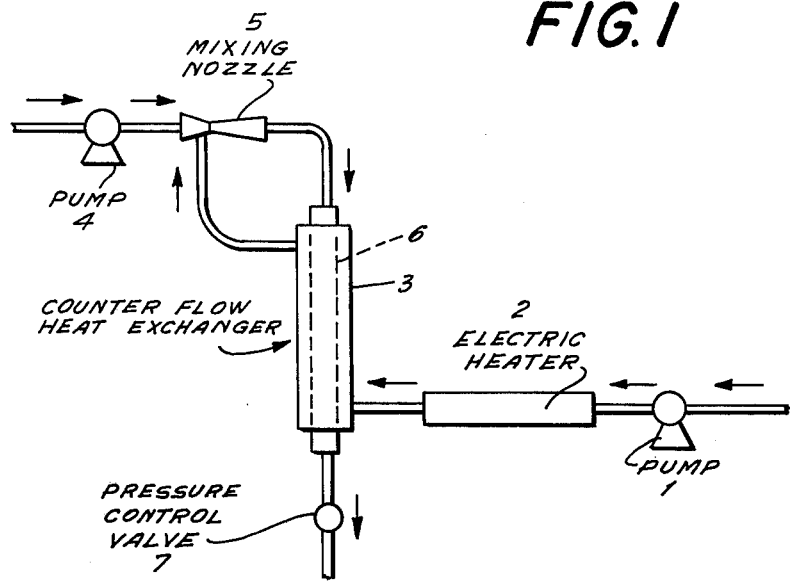
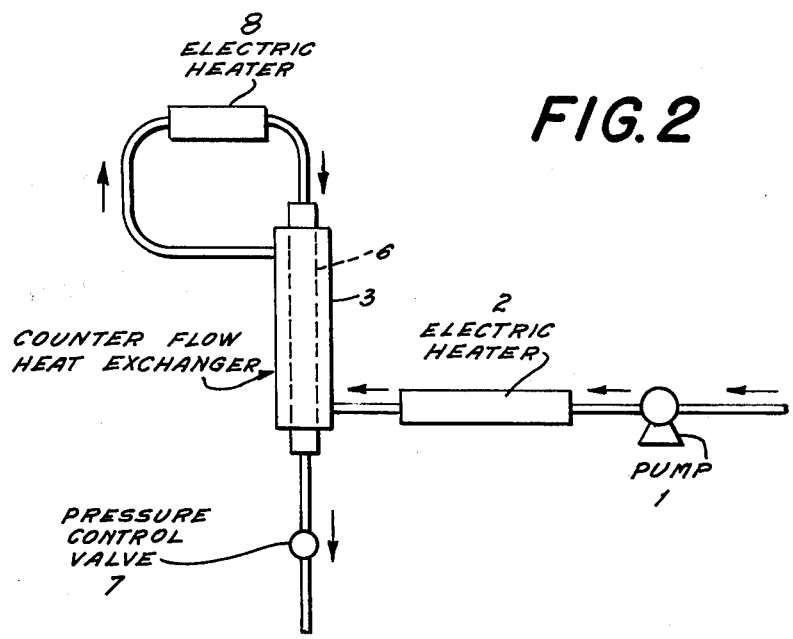

DETOXIFICATION OF CYANIDES AND CYANIDE-CONTAINING SOLUTIONS

This is a division of application Ser. No. 443,013, filed Feb. 15, 1974

BACKGROUND OF THE INVENTION

The invention relates to a method for the continuous detoxification of cyanides and cyanide-containing solutions, especially of cyanide-containing by-products and solutions of by-products such as are formed in galvanic, chemical and hardening-technology processes.

It is already known to detoxify cyanide-containing by-products and solutions of such by-products by establishing various chemical reactions, for example, reactions with hypochlorite, thiosulfate, Iron(II) salts, formaldehyde or hydrogen peroxide. These detoxification methods have the disadvantages that they are relatively expensive to perform and that the removal of the reaction products can involve new difficulties, inasmuch as these reaction products may themselves be in part insufficiently non-toxic.

It is also known that cyanides can be rendered harmless by oxidizing them at temperatures above 1500° C. or by oxidizing them using catalytic methods at temperatures above 400° C. The disadvantage of the first method is the formation of poisonous gases; the disadvantage of the second method is the sensitivity of the catalysts to toxic material.

It is furthermore known to detoxify cyanides at temperatures between 120° and 200° C under pressure, with the reaction being quickly initiated by using catalysts, such as for example cobalt and nickel compounds. The disadvantage of this method resides in the fact that relatively expensive catalysts must be employed, and in the fact that other substances contained in the cyanide-containing byproduct solution may cause an inactivation of the catalysts. If the just-mentioned approach is taken, but without the use of catalysts, the reaction times are excessive.

SUMMARY OF THE INVENTION

It is accordingly the general object of the invention to provide a method and an arrangement for the reliable detoxification of cyanides in a continuous process requiring only relatively short reaction times.

This object, and others which will become more understandable from the following description of exemplary embodiments, can be met according to one advantageous concept of the invention, by providing a method of detoxifying cyanides and cyanide-containing solutions which comprises the steps of preheating a cyanide solution to be detoxified by passing the cyanide solution through a heat exchanger, and initiating a detoxifying hydrolysis of the cyanide solution by subjecting the cyanide solution to a temperature shock raising the temperature of the cyanide solution to between about 200° and 250° C and passing the cyanide solution through a tubular reactor at a pressure of between about 40 and 140 atm.

Advantageously, the heat required to effect the temperature shock can be produced by means of a chemical reaction, for instance a heat-liberating neutralization, or else by conventional heating means, such as an electric heater or a conventional heat-exchanger. Advantageously, the cyanide solution is passed through the first flow path of an elongated heat exchanger, for example a concentric-tube counterflow heat exchanger, and then through the second flow path of the counterflow heat exchanger, with the cyanide solution, being subjected to the temperature shock subsequent to passing through the first flowpath but prior to passing through the second flow path.

The apparatus of the invention may advantageously consist of a pump which supplies water or cyanide solution, an electrically operated heat exchanger, a counterflow heat exchanger having first and second flow paths through which flow fluids of different temperature in first and opposite second directions, a dosing pump which adds a concentrated acid, for example concentrated sulfuric acid, to the cyanide solution, a mixing nozzle for effecting mixing of the cyanide solution and the concentrated acid, and/or a heating unit, and an outlet valve for control of the pressure in the second flow path of the counterflow heat exchanger.

The method and apparatus according to the invention can be used to perform the desired detoxification at a cost considerably lower than characteristics of prior-art detoxification methods, the approach of the present invention being characterized by shorter reaction times and higher throughput of cyanide-containing solutions, with the reaction products of the reaction according to the invention being removable inexpensively and without danger, and the method according to the invention not necessarily involving the use of additional chemicals.

BRIEF DESCRIPTION OF THE DRAWINGS

FIG. 1 shows an apparatus which includes a mixing nozzle to feed acid to heat the solution.

FIG. 2 shows an apparatus which uses an electric heater to heat the solution.

The following examples are illustrative of the concepts according to the present invention:

EXAMPLE 1

In this Example, use is made of the apparatus depicted in FIG. 1.

Initially, a pump 1 pumps water through an electrically operated heater 2 into the first flow chamber 3 of a counterflow heat exchanger, then out of the first flow chamber 3 and through a mixing nozzle 5, then back into and through the second flow chamber 6 of the counterflow heat exchanger, and then out of the second flow chamber 6 through a pressure-limiting valve 7. The water is heated by the electric heater to a temperature of 250° C. When the entire apparatus has become heated up to this temperature, the pumping of water by pump 1 terminates, and the pumping of cynanide solution by pump 1 commences. With the commencement of the pumping of cyanide solution to be detoxified, the electric heater 2 is turned off. The cyanide solution travels along the flow path just described with respect to the initial flow of heating water. A dosing pump 4 feeds concentrated sulfuric acid into the mixing nozzle 5, the concentrated sulfuric acid becoming mixed with the cyanide solution. The cyanide solution may be a simple aqueous solution of hydrogen cyanide. Sulfuric acid is added to the cyanide solution at such a rate that the pH of the solution does not drop below 7. As a result, the temperature of the solution leaving the first flow chamber 3 of the counterflow heat exchanger rises from 150° to 230° C.

This heat will then in the second flow chamber 6 be transferred to the fresh solution. The total residence time at temperatures above 220° C will be about 5 minutes. The detoxified solution leaves the reactor through the outlet valve 7, which may be a pressure-limiting valve or other suitable control valve for maintaining a desired pressure in the reactor. The liberated heat maintains the system at the temperature required for the detoxification reaction.

The reaction by which the cyanide-containing solution is detoxified involves the production of ammonia, as follows:

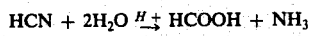

The liberated ammonia produces a pressure increase above the vapor pressure of the water, in dependence upon the cyanide concentration. The pressure-limiting valve 7 or other type of control valve will be set to maintain in the second flow chamber 6 a pressure which is higher than the vapor pressure of the solution in flow chamber 6 at the prevailing temperature. In the present example, such pressure should be between about 40 and 140 atm., depending upon the cyanide concentration.

EXAMPLE 2

In this example, use is made of the apparatus shown in FIG. 2.

The method is the same as explained with respect to the apparatus depicted in FIG. 1, except that the requisite heating of the cyanide solution is performed by a simple electric heater 8, instead of the previously described expedient of adding to the cyanide solution a concentrated acid such as to cause a heat-liberating reaction.

It will be understood that each of the elements described above, or two or more together, may also find a useful application in other types of constructions differing from the types described above.

While the invention has been illustrated and described as embodied in a method for the detoxification of a cyanide-containing solution it is not intended to be limited to the details shown, since various modifications and structural changes may be made without departing in any way from the spirit of the present invention.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

We claim:

1. A continuous process of detoxifying aqueous cyanide solutions comprising the steps of,
   starting the process cycle by heating a counterflow heat exchanger, then, in successive steps, passing the cyanide solution through a first flow path of said heat exchanger in order to preheat the solution, then, after passing the solution out of the heat exchanger, raising its temperature to a peak of about 200° to 250° C so as to effect a detoxifying hydrolysis of the solution, the solution being heated in said preheating step to more than half of the temperature reached as said peak temperature, and thereafter passing the detoxified solution through a second flow path of the heat exchanger in heat exchange contact with fresh cyanide solution passed into said first flow path of the heat exchanger in order to effect said preheating of the solution, and maintaining a pressure of about 40 to 140 atm. during the hydrolysis reaction and in said second flow path of the heat exchanger.

2. The process of claim 1 wherein the heat exchanger at the start of the reaction cycle is heated to a temperature of about 250° C.

3. The process of claim 1 wherein the heat exchanger is heated by pumping water of a temperature of about 250° C therethrough and shutting off the flow of water after the heat exchanger has reached the temperature of about 250° C whereupon the pumping of cyanide solution into the heat exchanger commences.

4. The process of claim 1 wherein the total time at a temperature above 220° C during the hydrolysis reaction is 5 minutes.

5. The process of claim 1 wherein the pressure increase during the hydrolysis reaction is due to the liberation of ammonia and a pressure higher than said pressure is maintained in said second flow chamber of the heat exchanger.

6. The process of claim 1 wherein pressure control means are provided to maintain the pressure at the desired rate.

7. The process of claim 1 wherein the said peak temperature is reached by passing the solution through a heating unit after it has left said first flow path of the heat exchanger.

8. The process of claim 1 wherein said peak temperature is reached by mixing the cyanide solution with concentrated acid after it has left said first flow path of the heat exchanger.

9. The process of claim 8 wherein said concentrated acid is sulfuric acid.

10. The process of claim 9 wherein said sulfuric acid is added to the cyanide solution at a rate not to cause the pH to drop below 7.

11. The process of claim 9 wherein the cyanide solution is heated in said preheating step to about 150° C which temperature is then raised to a peak of about 250° C by mixing the cyanide solution with said sulfuric acid at a rate not to cause the pH of the solution to drop below 7.

* * * * *